(12) United States Patent
Robinson

(10) Patent No.: US 12,007,487 B1
(45) Date of Patent: Jun. 11, 2024

(54) GLOBAL POSITIONING SYSTEM TIME VERIFICATION FOR AUTONOMOUS VEHICLES

(71) Applicant: Waymo LLC, Mountain View, CA (US)

(72) Inventor: Craig Robinson, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 372 days.

(21) Appl. No.: 17/546,496

(22) Filed: Dec. 9, 2021

Related U.S. Application Data

(60) Provisional application No. 63/132,480, filed on Dec. 31, 2020.

(51) Int. Cl.
  *G01S 19/25* (2010.01)
  *B60W 40/10* (2012.01)
  (Continued)

(52) U.S. Cl.
  CPC .......... *G01S 19/256* (2013.01); *B60W 40/10* (2013.01); *G01S 19/396* (2019.08); *G01S 19/45* (2013.01);
  (Continued)

(58) Field of Classification Search
  None
  See application file for complete search history.

(56) References Cited

U.S. PATENT DOCUMENTS

| | | |
|---|---|---|
| 5,334,986 A | 8/1994 | Fernhout |
| 5,438,517 A | 8/1995 | Sennott et al. |

(Continued)

FOREIGN PATENT DOCUMENTS

| | | | | |
|---|---|---|---|---|
| AU | 2021427796 A1 | * | 9/2023 | ............. G01S 19/04 |
| CA | 2823697 A1 | * | 7/2012 | ............. G01S 19/07 |

(Continued)

OTHER PUBLICATIONS

Laneurit et al., Accurate Vehicle Positioning on a Numerical Map, International Journal of Control, Automation, and Systems, vol. 3, No. 1, pp. 15-31, Mar. 2005.

(Continued)

*Primary Examiner* — Kevin R Steckbauer
(74) *Attorney, Agent, or Firm* — McDonnell Boehnen Hulbert & Berghoff LLP

(57) ABSTRACT

A method of updating a clock associated with an autonomous vehicle includes determining, at a processor, a sensor-based position of the autonomous vehicle. The sensor-based position is determined based on data from one or more sensors and based on a digital map accessible to the processor. The method also includes determining, at the processor, a global positioning system (GPS) computed position of the autonomous vehicle and a GPS time. The GPS computed position and the GPS time are determined based on a plurality of GPS signals received from GPS satellites. The method further includes comparing the sensor-based position to the GPS computed position to determine whether the sensor-based position is within a threshold distance from the GPS computed position. The method also includes updating the clock associated with the autonomous vehicle based on the GPS time in response to a determination that the sensor-based position is within the threshold distance from the GPS computed position.

20 Claims, 6 Drawing Sheets

(51) Int. Cl.
    *G01S 19/39*         (2010.01)
    *G01S 19/45*         (2010.01)
    *G01S 19/48*         (2010.01)

(52) U.S. Cl.
    CPC ........ *G01S 19/48* (2013.01); *B60W 2420/408* (2024.01); *B60W 2556/50* (2020.02)

(56) References Cited

U.S. PATENT DOCUMENTS

| | | | |
|---|---|---|---|
| 5,724,316 A * | 3/1998 | Brunts | G08G 1/096872 |
| | | | 368/21 |
| 6,127,970 A | 10/2000 | Lin | |
| 6,167,347 A | 12/2000 | Lin | |
| 6,697,736 B2 | 2/2004 | Lin | |
| 7,190,946 B2 | 3/2007 | Mazzara, Jr. et al. | |
| 8,965,621 B1 | 2/2015 | Urmson et al. | |
| 9,507,010 B2 * | 11/2016 | Bani Hani | G01S 19/235 |
| 9,785,150 B2 * | 10/2017 | Sibenac | G06V 20/56 |
| 10,725,144 B2 | 7/2020 | Adireddy et al. | |
| 10,757,485 B2 | 8/2020 | Al-Stouhi et al. | |
| 10,761,215 B2 * | 9/2020 | Kido | G01S 19/40 |
| 2003/0011511 A1 * | 1/2003 | King | G01S 19/08 |
| | | | 342/357.44 |
| 2003/0107513 A1 * | 6/2003 | Abraham | G01S 5/0036 |
| | | | 342/357.25 |
| 2009/0146879 A1 | 6/2009 | Chang | |
| 2011/0295462 A1 | 12/2011 | Park et al. | |
| 2015/0153178 A1 | 6/2015 | Koo et al. | |
| 2020/0064836 A1 | 2/2020 | Zhang et al. | |
| 2020/0096949 A1 * | 3/2020 | Bhattacharya | H04W 4/027 |
| 2020/0210234 A1 | 7/2020 | Priyadarshi | |
| 2022/0373695 A1 * | 11/2022 | Rautalin | G01S 19/256 |
| 2023/0258825 A1 * | 8/2023 | Huang | G01S 19/45 |
| | | | 455/456.1 |

FOREIGN PATENT DOCUMENTS

| | | | | |
|---|---|---|---|---|
| CA | 2823697 C | * | 11/2018 | ............ G01S 19/07 |
| CN | 1338614 A | * | 3/2002 | ............ G01S 19/25 |
| CN | 1642797 A | * | 7/2005 | ............ G01C 21/26 |
| CN | 101118413 A | * | 2/2008 | ............ G01S 19/14 |
| CN | 101118414 A | * | 2/2008 | ............ G01S 19/14 |
| CN | 100397094 C | * | 6/2008 | ............ G01C 21/26 |
| CN | 100570515 C | * | 12/2009 | ............ G01S 19/14 |
| CN | 101675358 A | * | 3/2010 | ........... G01S 13/876 |
| CN | 103370635 A | * | 10/2013 | ............ G01S 19/07 |
| CN | 103399484 A | | 11/2013 | |
| CN | 104678408 B | * | 2/2017 | ........... G01S 19/256 |
| CN | 108226980 A | * | 6/2018 | ........... G01C 21/165 |
| CN | 109154668 A | * | 1/2019 | ............ G01S 19/07 |
| CN | 108931791 B | * | 3/2021 | ........... G01C 21/165 |
| CN | 112513576 A | * | 3/2021 | ............ G01C 21/20 |
| CN | 113242104 A | * | 8/2021 | ............ G01S 19/42 |
| CN | 112513576 B | * | 5/2022 | ............ G01C 21/20 |
| CN | 113242104 B | * | 11/2022 | ............ G01S 19/42 |
| EP | 1546754 B1 | * | 5/2014 | ............ G01S 19/05 |
| JP | 2004117256 A | * | 4/2004 | |
| JP | 3951220 B2 | * | 8/2007 | |
| JP | 2008032636 A | * | 2/2008 | ............ G01S 19/14 |
| JP | 2008032637 A | * | 2/2008 | ............ G01S 19/14 |
| JP | 2020035142 A | | 3/2020 | |
| JP | 2022181484 A | * | 12/2022 | |
| KR | 100987319 B1 | | 10/2010 | |
| WO | WO-0230005 A2 | * | 4/2002 | ............ G01S 19/25 |

OTHER PUBLICATIONS

Cui et al. ,"Autonomous Vehicle Positioning With GPS in Urban Canyon Environments", IEEE Transactions on Robotics and Automation, vol. 19, No. 1, Feb. 2003.

* cited by examiner

GLOBAL POSITIONING SYSTEM TIME VERIFICATION FOR AUTONOMOUS VEHICLES

CROSS-REFERENCE TO RELATED APPLICATIONS

The present application claims priority from U.S. Provisional Patent Application No. 63/132,480, filed Dec. 31, 2020 and entitled "GLOBAL POSITIONING SYSTEM TIME VERIFICATION FOR AUTONOMOUS VEHICLES," the contents of which are incorporated herein in their entirety.

BACKGROUND

Autonomous vehicles or vehicles operating in an autonomous mode may send and receive transmissions to obtain information of a surrounding environment. As a non-limiting example, a radar system of an autonomous vehicle can send and receive transmissions for long-range object detection, as well as for tracking the velocity and direction of other vehicles in the surrounding environment. For accurate detection and tracking, synchronized transmissions are typically used by the radar system. In some scenarios, the radar system may use a global positioning system (GPS) computed time to synchronize transmissions between vehicles. Because of accuracy, the GPS computed time can also be used by other systems and functions associated with the autonomous vehicle. For example, GPS computed time can also be used in laser systems to determine an amount of time between transmission and reception of laser pulses for distance and speed estimation.

In some scenarios, GPS signals may be unavailable and the autonomous vehicle may not be able to compute a GPS time. In these scenarios, a clock used by the autonomous vehicle may drift with respect to GPS time. As a non-limiting example, if the autonomous vehicle enters a tunnel whereby reception of GPS signals is unavailable, the clock that is usually updated based on GPS time may drift. Upon detection of GPS signals after a period of time where reception of GPS signals is unavailable, it may be desirable to verify whether a computed GPS time is accurate prior to updating the clock.

SUMMARY

The present disclosure generally relates to verification of a computed global positioning system (GPS) time. For example, an autonomous vehicle can compute a GPS position and a GPS time based on received GPS signals from GPS satellites. To verify that the computed GPS time is accurate, the autonomous vehicle can compare the computed GPS position to a sensor-based position that is computed independent of GPS data. If the sensor-based position of the autonomous vehicle is within a threshold distance from the computed GPS position of the autonomous vehicle, the autonomous vehicle can determine that the GPS computations (e.g., the GPS position and time) are accurate. For example, if the distance between the sensor-based position and the computed GPS position is within one (1) meter, the autonomous vehicle can determine that the computed GPS time is accurate to within $3.3 \times 10^{-9}$ seconds. Based on this determination, the autonomous vehicle can update an internal clock based on the GPS time.

In a first aspect, a system includes a global positioning system (GPS) receiver configured to receive a plurality of GPS signals from GPS satellites. The system also includes one or more sensors. The system further includes a clock and a processor that is coupled to the GPS receiver, the one or more sensors, and the clock. The processor is configured to determine a sensor-based position of the autonomous vehicle. The sensor-based position is determined based on data generated from the one or more sensors and based on a digital map accessible to the processor. The processor is also configured to determine a GPS computed position of the autonomous vehicle and a GPS time. The GPS computed position and the GPS time are determined based on the plurality of GPS signals. The processor is further configured to compare the sensor-based position to the GPS computed position to determine whether the sensor-based position is within a threshold distance from the GPS computed position. The processor is also configured to update the clock based on the GPS time in response to a determination that the sensor-based position is within the threshold distance from the GPS computed position.

In a second aspect, a method of updating a clock associated with an autonomous vehicle includes determining, at a processor, a sensor-based position of the autonomous vehicle. The sensor-based position is determined based on data from one or more sensors and based on a digital map accessible to the processor. The method also includes determining, at the processor, a global positioning system (GPS) position of the autonomous vehicle and a GPS time. The GPS computed position and the GPS time are determined based on a plurality of GPS signals received from GPS satellites. The method further includes comparing the sensor-based position to the GPS computed position to determine whether the sensor-based position is within a threshold distance from the GPS computed position. The method also includes updating the clock associated with the autonomous vehicle based on the GPS time in response to a determination that the sensor-based position is within the threshold distance from the GPS computed position.

In a third aspect, a non-transitory computer-readable medium stores instructions that are executable by a processor to cause the processor to perform functions. The functions include determining a sensor-based position of the autonomous vehicle. The sensor-based position is determined based on data from one or more sensors and based on a digital map accessible to the processor. The functions also include determining a global positioning system (GPS) computed position of the autonomous vehicle and a GPS time. The GPS computed position and the GPS time are determined based on a plurality of GPS signals received from GPS satellites. The functions further include comparing the sensor-based position to the GPS computed position to determine whether the sensor-based position is within a threshold distance from the GPS computed position. The functions also include updating the clock associated with the autonomous vehicle based on the GPS time in response to a determination that the sensor-based position is within the threshold distance from the GPS computed position.

Other aspects, embodiments, and implementations will become apparent to those of ordinary skill in the art by reading the following detailed description, with reference where appropriate to the accompanying drawings.

DETAILED DESCRIPTION

Figure 1A:
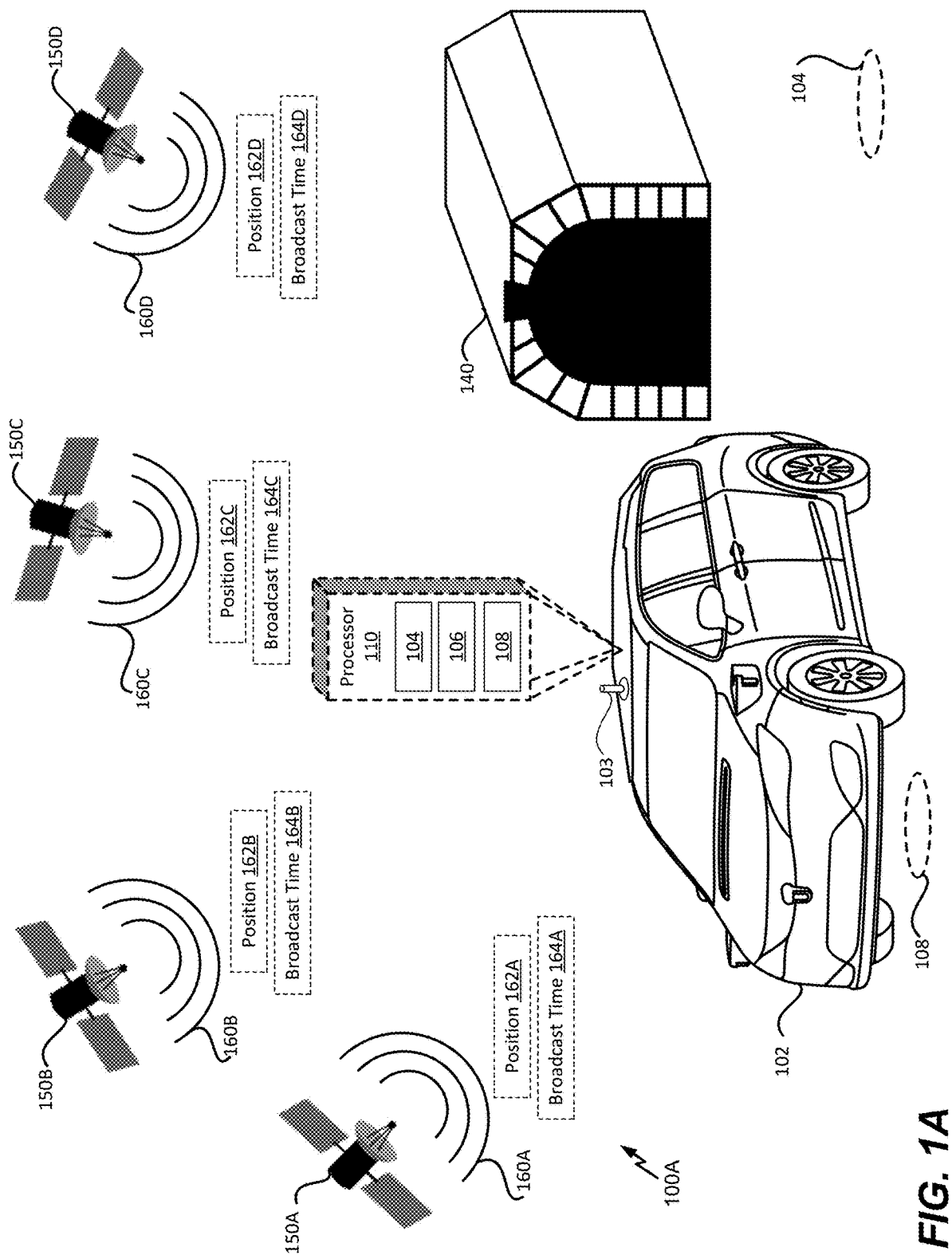
FIG. 1A is a diagram illustrating a scene in which an autonomous vehicle exits a low signal reception area to receive global positioning system (GPS) signals, in accordance with an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

The present disclosure generally relates to verification of a computed global positioning system (GPS) time. In particular, a processor of an autonomous vehicle may determine a sensor-based position of the autonomous vehicle independent of GPS and use the sensor-based position to verify whether a computed GPS time is accurate when GPS position data is available. For example, the processor may be operable to determine the sensor-based position of the autonomous vehicle at a first time instance. To illustrate, the autonomous vehicle can include one or more sensors, such as an inertial measurement unit, a laser system, a radar system, a Lidar system, etc. The autonomous vehicle may also include a digital map that is accessible to the processor. Based on sensor data (e.g., acceleration, velocity, orientation, etc.) generated from the one or more sensors, the processor can determine the sensor-based position (e.g., the latitude, longitude, and altitude) of the autonomous vehicle by tracking movements of the autonomous vehicle with respect to the digital map.

Additionally, the processor may be operable to determine a GPS computed position of the autonomous vehicle and a GPS time at the first time instance. For example, a GPS receiver coupled to the processor can receive a plurality of GPS signals broadcast from multiple satellites within a line of sight of the autonomous vehicle. Based on the GPS signals, the processor can perform a trilateration process to determine the GPS computed position (e.g., the latitude, longitude, and altitude) of the autonomous vehicle. In addition to determining the GPS computed position at the first time instance, the processor can also determine the GPS time based on the GPS signals. The GPS time is based on atomic clocks within the GPS satellites.

The processor can compare the sensor-based position to the GPS computed position to determine whether the sensor-based position is within a threshold distance from the GPS computed position. As a non-limiting example, the processor may determine whether the sensor-based position is within one (1) meter of the GPS computed position. In response to a determination that the sensor-based position is within the threshold distance from the GPS computed position, the processor may update a clock associated with the autonomous vehicle based on the GPS time. The updated clock can be used for other systems (e.g., non-GPS systems) associated with the autonomous vehicle, such as radar systems. Thus, according to the techniques described above, confirmation that the sensor-based position and the GPS computed position are similar may enable the processor to verify that the GPS time is accurate.

Thus, in scenarios in which the clock drifts with respect to the GPS clock (e.g., because GPS signals are unavailable), verification of a calculated GPS time when GPS signals become available may be performed prior to updating the clock. For example, if the autonomous vehicle travels through a tunnel and cannot receive GPS signals, upon exiting the tunnel, the autonomous vehicle can verify that a calculated GPS time, using newly available GPS signals, is accurate before updating the clock using the calculated GPS time.

II. EXAMPLE EMBODIMENTS

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1A, the multiple global positioning system (GPS) satellites are illustrated and associated with reference numbers 150A, 150B, 150C, etc. When referring to a particular one of the GPS satellites, such as the GPS satellite 150A, the distinguishing letter "A" is used. However, when referring to any arbitrary one of these GPS satellites or to these GPS satellites as a group, the reference number 150 is used without a distinguishing letter.

FIG. 1A is a diagram illustrating a scene 100A in which an autonomous vehicle exits a low signal reception area to receive GPS signals, in accordance with an example embodiment. For example, as illustrated in FIG. 1A, an autonomous vehicle 102 is shown exiting a low signal reception area 140, such as a tunnel, and entering an open area where the autonomous vehicle 102 is in a line of sight of a plurality of GPS satellites 150. Although the low signal reception area 140 is illustrated as a tunnel, in other implementations, the low signal reception area 140 can be any area where reception of GPS signals is compromised. For example, in other implementations, the low signal reception area 140 can include streets surrounded by tall buildings, alleys, parking garages, etc.

As described herein, the autonomous vehicle 102 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The autonomous vehicle 102 may be configured to operate fully or partially in an autonomous mode. For example, the autonomous vehicle 102 may control itself while in the autonomous mode, and may be operable to determine a current state of the autonomous vehicle 102 and its environment, determine a predicted behavior of at least one other vehicle in the environment, determine a confidence level that may correspond to a likelihood of the at least one other vehicle to perform the predicted behavior, and control the autonomous vehicle 102 based on the determined information. While in the autonomous mode, the autonomous vehicle 102 may be configured to operate without human interaction.

Figure 3:
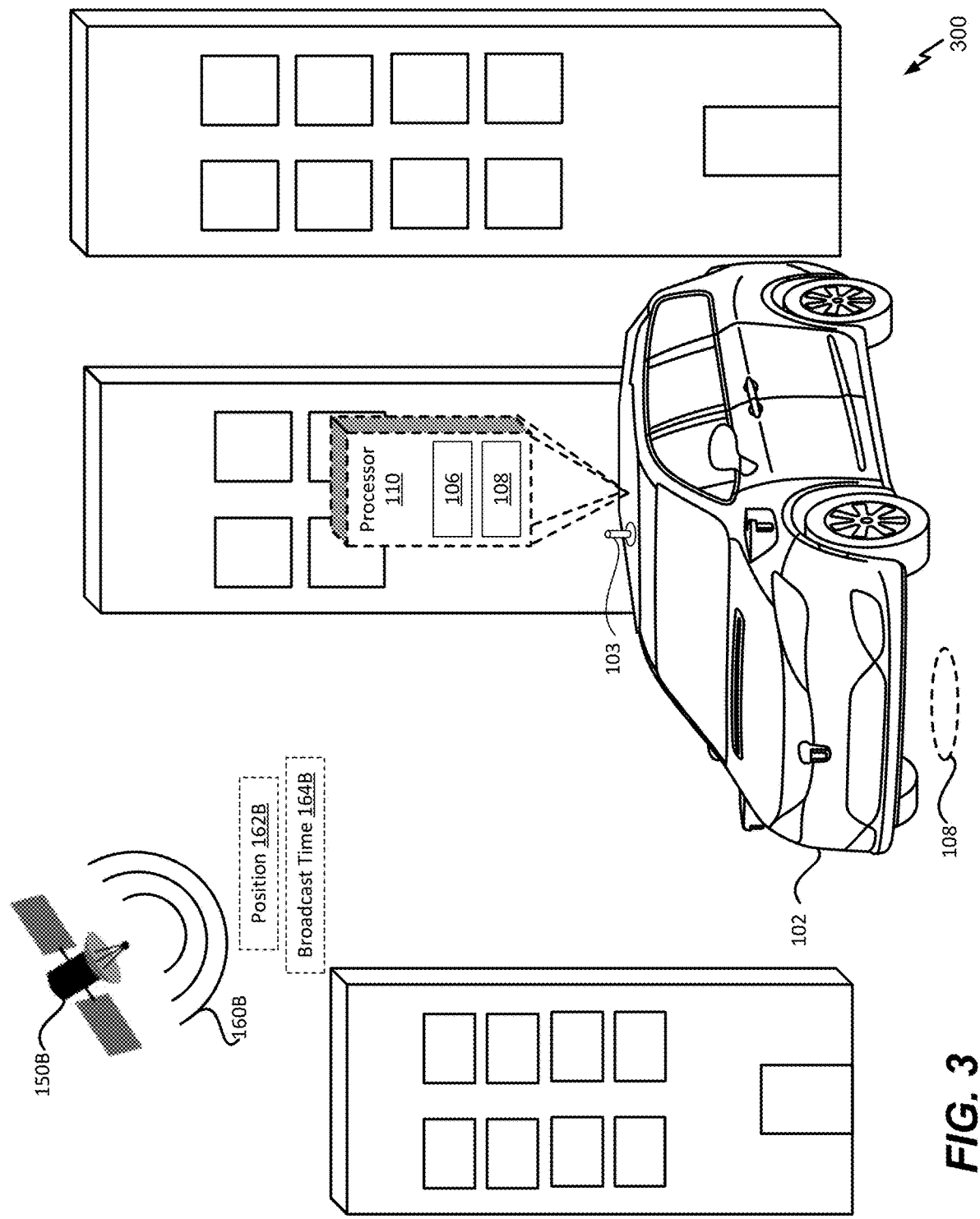
FIG. 3 is a diagram illustrating a scene in which an autonomous vehicle has limited reception to GPS signals, in accordance with an example embodiment.

As illustrated in FIG. 1A, four (4) GPS satellites 150 are configured to broadcast GPS signals 160 that are received by the autonomous vehicle 102 (after exiting the low signal reception area 140). For example, a GPS satellite 150A broadcasts GPS signals 160A that are received by the autonomous vehicle 102, a GPS satellite 150B broadcasts GPS signals 160B that are received by the autonomous vehicle 102, a GPS satellite 150C broadcasts GPS signals 160C that are received by the autonomous vehicle 102, and a GPS satellite 150D broadcasts GPS signals 160D that are received by the autonomous vehicle 102. Although four (4) GPS satellites 150 are shown, in other implementations, additional (or fewer) GPS satellites 150 can broadcast GPS signals 160 that are received by the autonomous vehicle 102. As a non-limiting example, in some scenarios, the autonomous vehicle 102 may be in the line of sight of five (5) GPS satellites 150 upon exiting the low signal reception area 140. As another non-limiting example, and as illustrated in FIG. 3, the autonomous vehicle may be in the line of sight of a single GPS satellite 150.

The GPS signals 160 include positioning information associated with the respective GPS satellite 150 and broadcast time information. For example, the GPS satellite 150A is configured to broadcast a GPS signal 160A that indicates a position 162A of the GPS satellite 150A and a broadcast time 164A of the GPS signal 160A. In a similar manner, the GPS satellite 150B is configured to broadcast a GPS signal 160B that indicates a position 162B of the GPS satellite 150B and a broadcast time 164B of the GPS signal 160B, the GPS satellite 150C is configured to broadcast a GPS signal 160C that indicates a position 162C of the GPS satellite 150C and a broadcast time 164C of the GPS signal 160C, and the GPS satellite 150D is configured to broadcast a GPS signal 160D that indicates a position 162D of the GPS satellite 150D and a broadcast time 164D of the GPS signal 160D. The broadcast times 164 of the GPS signals 160 may be based on atomic clocks within the GPS satellites 150 that can be accurate to within one-billionth of a second.

Upon reception of the GPS signals 160 after exiting the low signal reception area 140, a processor 110 integrated into the autonomous vehicle 102 is configured to determine a GPS computed position 104 of the autonomous vehicle 102 based on the GPS signals 160. As used herein, the "GPS computed position 104" of the autonomous vehicle 102 corresponds to a GPS computed position of a GPS antenna 103 coupled to the autonomous vehicle 102. The GPS computed position 104 can indicate a latitude coordinate of the GPS antenna 103, a longitude coordinate of the GPS antenna 103, and an altitude of the GPS antenna 103.

The GPS computed position 104 of the autonomous vehicle 102 may be determined based on a trilateration process. For example, the processor 110 can determine the distance (d) between the autonomous vehicle 102 and each GPS satellite 150. Upon determining the distance (d) between the autonomous vehicle 102 and a particular GPS satellite 150, the processor 110 can use the position 162 of the particular GPS satellite 150 to determine perimeter coordinates of a sphere around the particular GPS satellite 150. The center point of the sphere may be located at the position 162 of the particular GPS satellite 150, and a radii of the sphere is equal to the determined distance (d). Based on the center point and the radii, the processor 110 can determine the perimeter coordinates such that each point on the perimeter of the sphere is the determined distance (d) from the particular GPS satellite 150. This process can be repeated for each GPS satellite 150. For example, the processor 110 is configured to determine perimeter coordinates for spheres around each GPS satellite 150 based on the distance between the GPS satellites 150 and the autonomous vehicle 102 and based on the position 162 of each GPS satellite 150. The processor 110 can determine the GPS computed position 104 based on where spheres for each GPS satellite 150 intersect. For example, the GPS computed position 104 may correspond to the positional coordinates (e.g., latitude, longitude, and altitude) where the spheres for all of GPS satellites 150 intersect.

The processor 110 can determine the distance (d) between the autonomous vehicle 102 and each GPS satellite 150 based on a time difference between the broadcast time 164 of the respective GPS signal 160 and the reception time of the GPS signal 160 at the autonomous vehicle 102. The time difference can be multiplied by the speed of light (C) to determine the distance (d) between the autonomous vehicle 102 and the respective GPS satellite 150, where the speed of light (C) is equal to approximately $2.99792458 \times 10^8$ meters per second (m/s). It will be recognized that the processor may determine the GPS computed position 104 and the time difference at substantially the same time.

Thus, to determine the distance (d) between the GPS satellite 150A and the autonomous vehicle 102, the processor 110 can determine the time difference between the broadcast time 164A of the GPS signal 160A and the reception time of the GPS signal 160A. To illustrate, consider an example in which the processor 110 determines the time difference between the broadcast time 164A of the GPS signal 160A and the reception time of the GPS signal 160A is equal to $6.731 \times 10^{-3}$ seconds. The processor 110 can determine that the distance (d) between the GPS satellite 150A and the autonomous vehicle 102 is approximately 20,107 kilometers (km) (e.g., $6.731 \times 10^{-3} \times C$).

After determining the distance (d) between the GPS satellite 150A and the autonomous vehicle 102, the processor 110 can use the position 162A of the GPS satellite 150A to determine perimeter coordinates of a sphere around the GPS satellite 150A. To illustrate, let's assume that the position 162A of the GPS satellite 150A, as indicated by the GPS signal 160A, corresponds to an altitude of 20,624 km, a latitude of 52.2° N, and a longitude of 125.7° W. In this scenario, the processor 110 can determine all positional coordinates (e.g., longitude, latitude, and altitude) that are 20,107 km away from the position 162A. In some scenarios, the processor 110 can reduce processing complexity by bypassing a determination of positional coordinates that do not correspond to a location on the surface of the earth. It should be understood that the above example is merely for illustrative purposes and should not be construed as limiting.

The processor 110 can perform similar operations with respect to the other GPS satellites 150B-150D to determine perimeter coordinates of spheres around the other GPS satellites 150A-150D. To complete the trilateration process, the processor 110 can determine coordinates (e.g., longitude, latitude, and altitude) where the spheres around each GPS satellite 150 intersect. The GPS computed position 104 of the autonomous vehicle 102 may correspond to the coordinates where spheres for each GPS satellite 150 intersect. In other implementations, the location or position of the autonomous vehicle may be determined by triangulation, multilateration, GPS positioning, cell identification, enhanced cell identification, or any other suitable process.

Because the autonomous vehicle 102 was in the low signal reception area 140, an internal clock (e.g., a quartz clock) of the autonomous vehicle 102 may have experienced drift with respect to a GPS time 106, as the GPS signals 160 are not available for use to update the internal clock while the autonomous vehicle 102 is in the low signal reception area 140. However, upon exiting the low signal reception area 140, the processor 110 can compute the GPS time 106 based on the GPS signals 160 to update the internal clock. For example, the processor 110 can update the internal clock using the time information in the GPS signals 160 to calculate a deviation of the internal clock with respect to the GPS time 106.

However, prior to updating the internal clock based on the computed GPS time 106, the processor 110 is configured to verify the accuracy of the computed GPS time 106 (or the clock deviation) to ensure that the internal clock is accurately updated. To verify the accuracy of the computed GPS time 106, the processor 110 may compare the GPS computed position 104 of the autonomous vehicle 102 to a sensor-based position 108 of the autonomous vehicle 102. As used herein, the "sensor-based position 108" of the autonomous vehicle 102 corresponds to the position of the GPS antenna 103 as determined by sensors of the autonomous vehicle 102 and a map. Thus, the processor 110 compares a computed GPS position of the GPS antenna 103 (e.g., the GPS computed position 104) to a computed position of the GPS antenna 103 based on vehicle sensors and a digital map (e.g., the sensor-based position 108). If the sensor-based position 108 of the autonomous vehicle 102 is within a threshold distance from the GPS computed position 104 of the autonomous vehicle 102, the processor 110 may determine that the GPS computations (e.g., the GPS computed position 104 and the GPS time 106) are accurate and may update the internal clock based on the computed GPS time 106.

Thus, prior to verifying the GPS time 106, the processor 110 is configured to determine the sensor-based position 108 of the autonomous vehicle 102 independently from GPS data. The sensor-based position 108 may be determined based on sensor data from one or more sensors and based on a digital map accessible to the processor 110. For example, the autonomous vehicle 102 can include one or more sensors, such as inertial measurement units (IMUs), gyroscopes, accelerometers, laser systems, radar systems, Lidar systems, wheel speed sensors, etc. The one or more sensors can provide sensor data to the processor 110 that indicates an angular rate of the autonomous vehicle 102, an orientation of the autonomous vehicle 102, a speed of the autonomous vehicle 102, an altitude of the autonomous vehicle 102, etc. The processor 110 may also have access to a digital map.

The processor 110 is configured to track the sensor-based position 108 of the autonomous vehicle 102 on the digital map using the sensor data from the one or more sensors. Thus, the processor 110 can determine the sensor-based position 108 by processing vehicle information (e.g., speed, orientation, acceleration, altitude, etc.) from the one or more sensors and correlating the vehicle information with the digital map. It should be appreciated that, over the course of hours, the sensor-based position 108 can be accurate to within thirty (30) centimeters (cm) without GPS.

As described above, if the sensor-based position 108 of the autonomous vehicle 102 is within a threshold distance from the GPS computed position 104 of the autonomous vehicle 102, the processor 110 may determine that the GPS computations (e.g., the GPS computed position 104 and the GPS time 106) are accurate and may update the internal clock based on the computed GPS time 106. For example, the accuracy of the GPS time 106 is approximately equal to the accuracy of the GPS computed position 104 divided by the speed of light. Thus, if the sensor-based position 108 and the GPS computed position 104 are within one (1) meter of accuracy, the GPS time 106 is accurate to within $3.3 \times 10^{-9}$ seconds (the time it takes for light to travel one meter). Therefore, if the sensor-based position 108 is within one (1) meter of the GPS computed position 104, the processor 110 can determine that the calculated GPS time 106 is accurate and can update the internal clock based on the GPS time 106.

Although the threshold distance is described above as one (1) meter, it should be appreciated that other threshold distances can be used by the processor 110 to determine that the GPS time 106 accurate. As another non-limiting example, the processor 110 can determine that the GPS time 106 is accurate if the GPS computed position 104 of the autonomous vehicle 102 is within fifteen (15) meters of the sensor-based position 108 of the autonomous vehicle 102. In some implementations, the threshold distance can be dynamically changed. In other implementations, the threshold distance may be adjusted or set to any suitable distance to achieve a desired accuracy of the GPS time.

The techniques described with respect to FIG. 1A enable verification of the GPS time 106, based on position comparisons, prior to updating the internal clock of the autonomous vehicle 102. Thus, in scenarios where the internal clock of the autonomous vehicle 102 drifts with respect to the GPS clock (e.g., the atomic clock) because the GPS signals 160 are unavailable, verification of the GPS time 106 can be performed prior to updating the internal clock. For example, if the autonomous vehicle 102 travels through the low signal reception area 140 and cannot receive the GPS signals 160, upon exiting the low signal reception area 140, the autonomous vehicle 102 can verify the accuracy of the GPS computations before updating the internal clock. It should be appreciated that accurately updating the internal clock of the autonomous vehicle 102 based on the GPS time 106 enables other systems, such as radar systems, to synchronize transmissions for long-range object detection and tracking. Additionally, accurately updating the internal clock of the autonomous vehicle 102 based on the GPS time 106 improves time duration estimation between laser pulse transmission and laser pulse reception, which in turn, improves distance and speed estimation for laser systems.

Figure 1B:
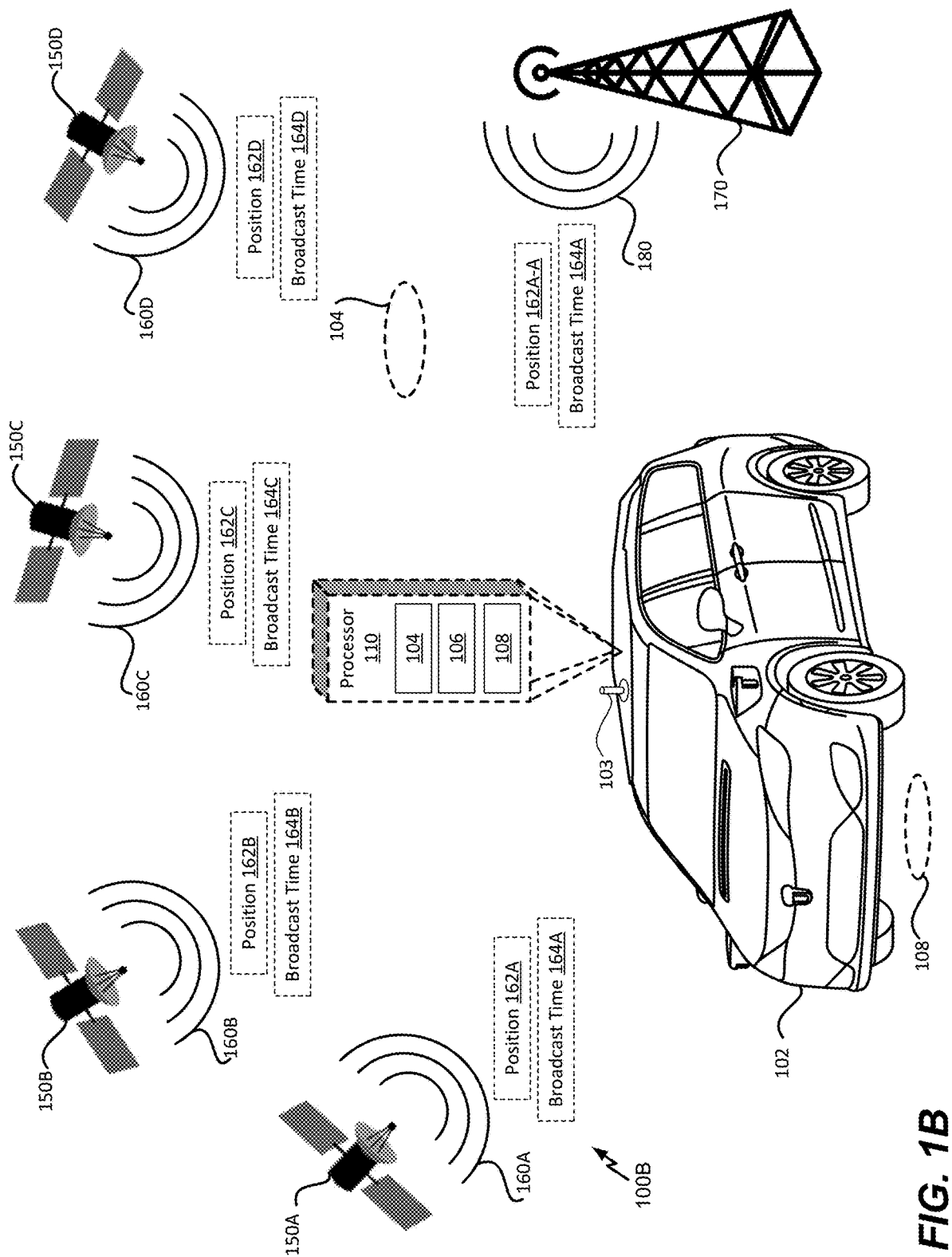
FIG. 1B is a diagram illustrating a scene in which the autonomous vehicle receives GPS signals and a spoofed GPS signal, in accordance with an example embodiment.

The techniques described with respect to above may also be used to detect GPS spoofing. To illustrate, FIG. 1B is a diagram illustrating a scene 100B in which the autonomous vehicle receives GPS signals and a spoofed GPS signal, in accordance with an example embodiment. In FIG. 1B, the GPS satellite 150A is configured to broadcast the GPS signal 160A, the GPS satellite 150B is configured to broadcast the GPS signal 160B, the GPS satellite 150C is configured to broadcast the GPS signal 160C, and the GPS satellite 150D is configured to broadcast the GPS signal 160D.

In addition to the GPS signals 160B-160D broadcast by the GPS satellites 150B-150D, respectively, a radio transmitter 170 is configured to broadcast a spoofed GPS signal 180 that is received by the autonomous vehicle 102. In the illustrated embodiment, the spoofed GPS signal 180 indicates a spoofed (e.g., false) position 162A-A of the GPS satellite 150A at the broadcast time 164A. However, it should be understood that in other embodiments, the spoofed GPS signal 180 can indicate a spoofed position of one of the other GPS satellites 150B-150D. A signal strength of the spoofed GPS signal 180 may be greater than a signal strength of the GPS signal 160A. As a result, the spoofed GPS signal 180 may override the legitimate GPS signal 160A at the processor 110 of the autonomous vehicle 102.

Because the spoofed GPS signal 180 overrides the legitimate GPS signal 160A, the processor 110 may determine the GPS computed position 104 of the autonomous vehicle 102 based on the spoofed position 162A-A (e.g., the inaccurate coordinates) of the GPS satellite 150A transmitted by the radio transmitter 170. As a result, the GPS computed position 104 of the autonomous vehicle 102, as determined by the processor 110, may be substantially inaccurate.

Because the GPS computed position 104 determined by the autonomous vehicle 102 is substantially inaccurate, the computed GPS time 106 may also be inaccurate. Thus, in a similar manner as described with respect to FIG. 1A, prior to updating the internal clock based on the computed GPS time 106, the processor 110 may verify the accuracy of the computed GPS time 106 (or the clock deviation) to ensure that the internal clock is accurately updated. To verify the accuracy of the computed GPS time 106, the processor 110 may compare the GPS computed position 104 of the autonomous vehicle 102 to the sensor-based position 108 of the autonomous vehicle 102. In the scenario described with respect to FIG. 1B whereby the GPS computed position 104 is determined based on the spoofed position 162A-A of the GPS satellite 150A transmitted by the radio transmitter 170, the sensor-based position 108 of the autonomous vehicle 102 may not be within threshold distance from the GPS computed position 104. As a result, the processor 110 may determine that the GPS computed position 104 is inaccurate and may bypass updating the internal clock based on the GPS time 106

According to the techniques described with respect to FIG. 1B, the processor 102 is also configured to detect GPS spoofing based on a comparison between the GPS computed position 104 and the sensor-based position 108. To illustrate, the processor 110 may determine that the GPS computed position 104 is the result of GPS spoofing if the GPS computed position 104 and the sensor-based position 108 are not within spoofing threshold distance. As a non-limiting example, if the GPS computed position 104 is not within ten (10) meters of the sensor-based position 108, the processor 110 may determine that the GPS computed position 104 is the result of GPS spoofing.

It should be understood that the techniques described with respect to FIG. 1B may also be used to detect GPS interference. For example, radio interference with one or more of the GPS signals 160A-160D can also be detected based on the determined GPS computed position 104 being substantially distant from the sensor-based position 108.

Figure 2:
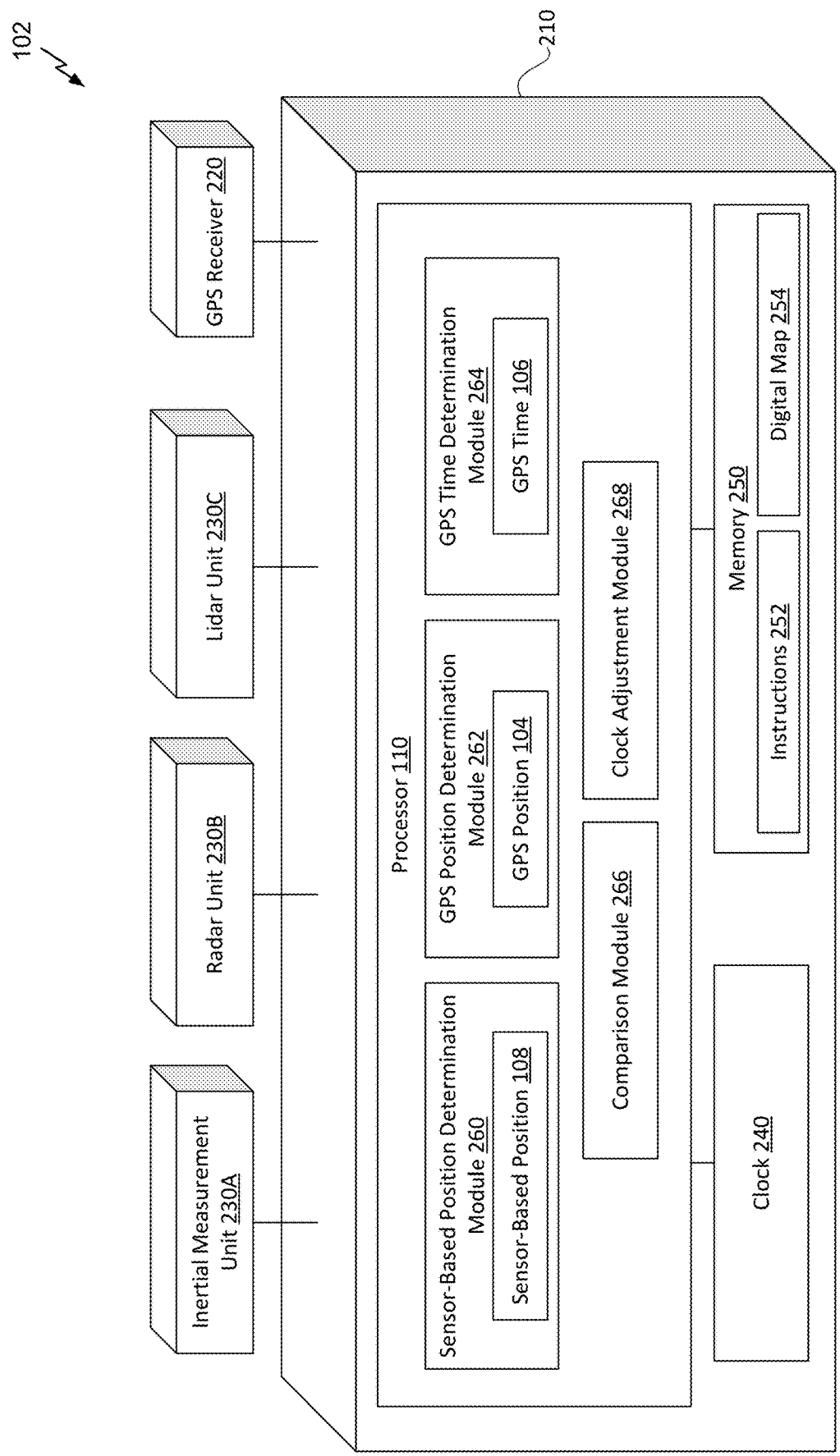
FIG. 2 is a diagram illustrating components of the autonomous vehicle, in accordance with an example embodiment.

FIG. 2 is a diagram illustrating components of the autonomous vehicle 102, in accordance with an example embodiment. The autonomous vehicle includes a computing device 210, a GPS receiver 220 coupled to the computing device 210, and a plurality of sensors 230 coupled to the computing device 210. According to the illustration in FIG. 2, the plurality of sensors 230 include an inertial measurement unit 230A, a radar unit 230B, and a Lidar unit 230C. However, in other implementations, additional sensors can be coupled to the computing device 210. As non-limiting examples, an accelerometer can be coupled to the computing device 210, a gyroscope can be coupled to the computing device 210, etc.

The computing device 210 includes the processor 110, a clock 240 coupled to the processor 110, and a memory 250 coupled to the processor 110. Although the clock 240 is illustrated as a separate component from the processor 110, in some implementations, the clock 240 can be integrated into the processor 110. The memory 250 can be a non-transitory computer-readable medium that stores instructions 252 that are executable by the processor 110. The processor 110 includes a sensor-based position determination module 260, a GPS position determination module 262, a GPS time determination module 264, a comparison module 266, and a clock adjustment module 268. According to some implementations, one or more of the modules 260-268 can correspond to software (e.g., instructions 252) executable by the processor 110. According to other implementations, one or more of the modules 260-268 can correspond to dedicated circuitry (e.g., application-specific integrated circuits (ASICs) or field programmable gate arrays (FPGAs)) integrated into the processor 110.

During operation, the GPS receiver 220 is configured to receive the GPS signals 160 broadcast by the GPS satellites 150 when the autonomous vehicle 102 exits the low signal reception area 140. For example, the GPS receiver 220 is configured to receive the plurality of GPS signals 160A-160D from the GPS satellites 150A-150D, respectively. As described below, the GPS position determination module 262 is configured to determine the GPS computed position 104 of the autonomous vehicle 102 based on the GPS signals 160. Although illustrated as a component in the processor 110, in some implementations, the GPS position determination module 262 can be integrated into the GPS receiver 220 such that the GPS receiver 220 can determine the GPS computed position 104 of the autonomous vehicle 102.

To determine the GPS computed position 104 of the autonomous vehicle 102, the GPS position determination module 262 can determine the distance (d) between the autonomous vehicle 102 and each GPS satellite 150 based on a time difference between the broadcast time 164 of the respective GPS signal 160 and the reception time of the GPS signal 160 at the GPS receiver 220. The time difference can be multiplied by the speed of light (C) to determine the distance (d) between the autonomous vehicle 102 and the respective GPS satellite 150. After determining the distance (d) between each GPS satellite 150 and the autonomous vehicle 102, the GPS position determination module 262 can use the position 162 of each GPS satellite 150 to determine perimeter coordinates of a sphere around each GPS satellite 150, as described with respect to FIG. 1. To determine the GPS computed position 104, the GPS position determination module 262 can identify coordinates (e.g., longitude, latitude, and altitude) where the spheres around each GPS satellite 150 intersect.

The sensor-based position determination module 260 is configured to determine the sensor-based position 108 of the autonomous vehicle 102 based on one or more of the sensors 230. To illustrate, the sensors 230 are configured to detect properties associated with the autonomous vehicle 102 and to generate data indicative of the properties. As non-limiting examples, the inertial measurement unit 230A is configured to detect an angular rate associated with the autonomous vehicle 102, an orientation of the autonomous vehicle 102, a speed of the autonomous vehicle 102, an altitude of the autonomous vehicle 102, etc. Sensor data indicative of these properties can be generated by the inertial measurement unit 230A (or by other sensors 230) and provided to the sensor-based position determination module 260. In a similar manner, the radar unit 230B and the Lidar unit 230C can generate and provide data indicative of a position of the autonomous vehicle 102 to the sensor-based position determination module 260.

The sensor-based position determination module 260 may also have access to a digital map 254. For example, the digital map 254 may be stored in the memory 250 and may be accessible to the sensor-based position determination module 260. The sensor-based position determination module 260 is configured to track the sensor-based position 108 of the autonomous vehicle 102 on the digital map 254 using the sensor data from the one or more sensors 230. Thus, the processor 110 can determine the sensor-based position 108 by processing vehicle information (e.g., speed, orientation, acceleration, altitude, etc.) from the one or more sensors 230 and correlating the vehicle information with the digital map 254.

The GPS time determination module 264 can compute the GPS time 106 based on the GPS signals 160 to update the clock 240. For example, the GPS time determination module 264 can calculate a deviation of the clock 240 with respect to the GPS time 106.

However, prior to updating the clock 240 based on the computed GPS time 106, the processor 110 is configured to verify the accuracy of the computed GPS time 106 (or the clock deviation) to ensure that the clock 240 is accurately updated. To verify the accuracy of the computed GPS time 106, the comparison module 266 may compare the GPS computed position 104 of the autonomous vehicle 102 to the sensor-based position 108 of the autonomous vehicle 102. If the sensor-based position 108 of the autonomous vehicle 102 is within a threshold distance from the GPS computed position 104 of the autonomous vehicle 102, the processor 110 may determine that the GPS computations (e.g., the GPS computed position 104 and the GPS time 106) are accurate and may update the clock 240 based on the computed GPS time 106.

In response to a determination that the sensor-based position 108 is within the threshold distance from the GPS computed position 104, the clock adjustment module 268 is configured to update the clock 240 based on the GPS time 106. For example, if the sensor-based position 108 and the GPS computed position 104 are within one (1) meter of accuracy, the GPS time 106 is accurate to within $3.3 \times 10^{-9}$ seconds. Therefore, the clock adjustment module 268 can update the clock 240 based on the calculated GPS time 106 with a relatively high degree of confidence of accuracy.

The techniques described with respect to FIG. 2 enable verification of the GPS time 106 prior to updating the clock 240. Thus, in scenarios where the clock 240 drifts with respect to the GPS clock (e.g., the atomic clock) because the GPS signals 160 are unavailable, verification of the GPS time 106 can be performed prior to updating the clock 240. It should be appreciated that accurately updating the clock 240 based on the GPS time 106 enables other systems, such as radar systems, to synchronize transmissions for long-range object detection and tracking. Additionally, accurately updating the clock 240 based on the GPS time 106 improves time duration estimation between laser pulse transmission and laser pulse reception, which in turn, improves distance and speed estimation for laser systems.

FIG. 3 is a diagram illustrating a scene 300 in which an autonomous vehicle has limited reception to GPS signals, in accordance with an example embodiment. For example, as illustrated in FIG. 3, the autonomous vehicle 102 is proximate to multiple buildings and is in the line of sight of a single satellite 150B. Thus, the autonomous vehicle 102 is positioned to only receive the GPS signals 160B from the GPS satellite 150B, as opposed to being positioned to receive the GPS signals 160A-160D from all of the GPS satellites 150A-150D illustrated in FIG. 1A.

According to the implementation described with respect to FIG. 3, the autonomous vehicle 106 can determine the GPS time 106 based on the sensor-based position 108 and the GPS signal 160B. As described above, the sensor-based position determination module 260 is configured to track the sensor-based position 108 of the autonomous vehicle 102 on the digital map 254 using the sensor data from the one or more sensors 230. Using the longitude, latitude, and altitude of the autonomous vehicle 102, as indicated by the sensor-based position 108, the processor 110 can calculate the GPS time 106 using the GPS signal 160B.

Thus, in scenarios where limited GPS reception is available, such as when the autonomous vehicle 102 is surrounded by tall buildings, the processor 110 can use the sensor-based position 108 of the autonomous vehicle 102 to determine the GPS time 106 and update the clock 240.

III. EXAMPLE METHODS

Figure 4:
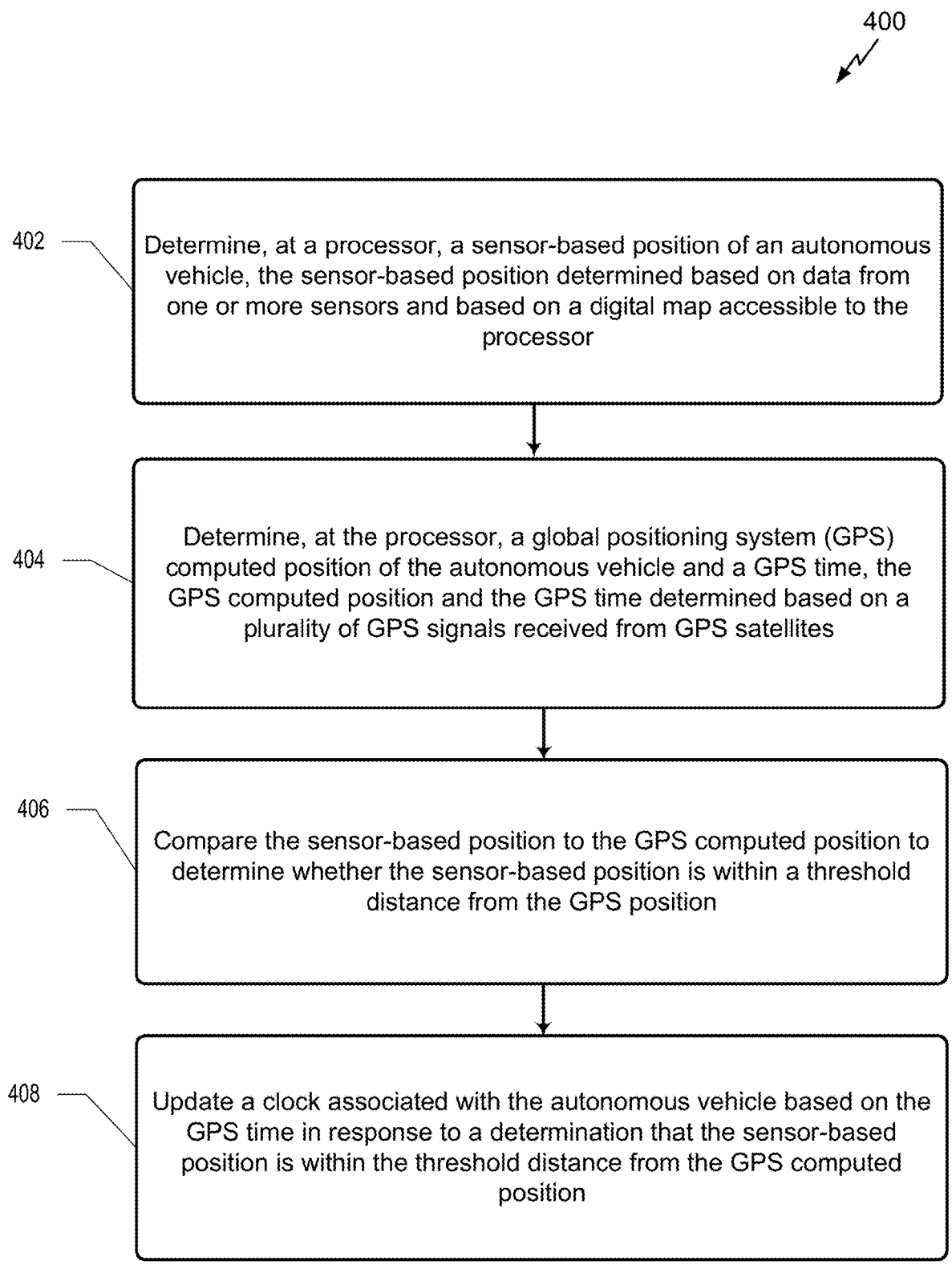
FIG. 4 is a flowchart of a method, according to an example embodiment.

FIG. 4 is a flowchart of a method 400, according to an example embodiment. The method 400 can be performed by the autonomous vehicle 102.

The method 400 includes determining, at a processor, a sensor-based position of an autonomous vehicle, at 402. The sensor-based position is determined based on data from one or more sensors and based on a digital map that is accessible to the processor. For example, the sensor-based position determination module 260 may determine the sensor-based position 108 of the autonomous vehicle 102 independently from GPS data. To illustrate, the sensors 230 can detect properties associated with the autonomous vehicle 102 and can generate sensor data indicative of the properties. The sensor-based position determination module 260 can track the sensor-based position 108 of the autonomous vehicle 102 on the digital map 254 using the sensor data from the one or more sensors 230. Thus, the sensor-based position determination module 260 can determine the sensor-based position 108 by processing vehicle information (e.g., speed, orientation, acceleration, altitude, etc.) from the one or more sensors 230 and correlating the vehicle information with the digital map 254.

The method 400 also includes determining, at the processor, a GPS computed position of the autonomous vehicle and a GPS time, at 404. The GPS computed position and the GPS time are determined based on a plurality of GPS signals received from GPS satellites. For example, the GPS position determination module 262 can determine the distance (d) between the autonomous vehicle 102 and each GPS satellite 150 based on a time difference between the broadcast time 164 of the respective GPS signal 160 and the reception time of the GPS signal 160 at the GPS receiver 220. After determining the distance (d) between each GPS satellite 150 and the autonomous vehicle 102, the GPS position determination module 262 can use the position 162 of each GPS satellite 150 to determine perimeter coordinates of a sphere around each GPS satellite 150, as described with respect to FIG. 1. To determine the GPS computed position 104, the GPS position determination module 262 can identify coordinates (e.g., longitude, latitude, and altitude) where the spheres around each GPS satellite 150 intersect. Additionally, the GPS time determination module 264 can compute the GPS time 106 based on the GPS signals 160 to update the clock 240.

The method 400 also includes comparing the sensor-based position to the GPS computed position to determine whether the sensor-based position is within a threshold distance from the GPS computed position, at 406. For example, the comparison module 266 may compare the GPS computed position 104 of the autonomous vehicle 102 to the sensor-based position 108 of the autonomous vehicle 102. If the sensor-based position 108 of the autonomous vehicle 102 is within a threshold distance from the GPS computed position 104 of the autonomous vehicle 102, the processor 110 may determine that the GPS computations (e.g., the GPS computed position 104 and the GPS time 106) are accurate and may update the clock 240 based on the computed GPS time 106. According to one implementation, the threshold distance can be equal to one (1) meter.

The method 400 also includes updating a clock associated with the autonomous vehicle based on the GPS time in response to a determination that the sensor-based position is within the threshold distance from the GPS computed position, at 408. For example, in response to a determination that the sensor-based position 108 is within the threshold distance from the GPS computed position 104, the clock adjustment module 268 may update the clock 240 based on the GPS time 106. For example, if the sensor-based position 108 and the GPS computed position 104 are within one (1) meter of accuracy, the GPS time 106 is accurate to within $3.3 \times 10^{-9}$ seconds. Therefore, the clock adjustment module 268 can update the clock 240 based on the calculated GPS time 106 with a relatively high degree of confidence of accuracy.

According to one implementation, the method 400 can also include determining whether a period of time has elapsed since comparing the sensor-based position 108 to the GPS computed position 104 in response to a determination that sensor-based position 108 is not within the threshold distance from the GPS computed position 104. As a non-limiting example, the processor 110 can determine whether ten (10) milliseconds (ms) has elapsed since the comparison. In response to a determination that the period of time has elapsed, the method 400 can include determining a second sensor-based position of the autonomous vehicle 102 at a second time instance. The method 400 can also include determining a second GPS computed position of the autonomous vehicle 102 and a second GPS time. The method 400 can also include comparing the second sensor-based position to the second GPS computed position to determine whether the second sensor-based position is within the threshold distance from the second GPS computed position. The method 400 can further include updating the clock 240 associated with the autonomous vehicle 102 based on the second GPS time in response to a determination that the second sensor-based position is within the threshold distance from the second GPS computed position. Thus, according to the above-described implementation, a verification process of the GPS time can be automatically retriggered after the period of time (e.g., 10 ms) when a previous verification was unsuccessful.

According to one implementation, the method 400 can include monitoring at least one condition in response to a determination that sensor-based position 108 is not within the threshold distance from the GPS computed position 104. As a non-limiting example, the at least one condition can correspond to a number of GPS satellites 150 having GPS signals 160 within range of the autonomous vehicle 102. Upon detection of a change in the at least one condition, the method 400 can include determining a second sensor-based position of the autonomous vehicle 102 at a second time instance. A non-limiting example of detecting the change in the at least one condition can include detecting a different number of GPS satellites 150 having GPS signals 160 within range of the autonomous vehicle 102. The method 400 can also include determining a second GPS computed position of the autonomous vehicle 102 and a second GPS time. The method 400 can also include comparing the second sensor-based position to the second GPS computed position to determine whether the second sensor-based position is within the threshold distance from the second GPS computed position. The method 400 can further include updating the clock 240 associated with the autonomous vehicle 102 based on the second GPS time in response to a determination that the second sensor-based position is within the threshold distance from the second GPS computed position. Thus, according to the above-described implementation, a verification process of the GPS time can be automatically retriggered upon exposure to GPS signals 160 from different (e.g., additional) satellites when a previous verification was unsuccessful.

The method 400 of FIG. 4 enables verification of the GPS time 106, based on position comparisons, prior to updating the clock 240 of the autonomous vehicle 102. Thus, in scenarios where the clock 240 of the autonomous vehicle 102 drifts with respect to the GPS clock (e.g., the atomic clock) because the GPS signals 160 are unavailable, verification of the GPS time 106 can be performed prior to updating the clock 240. For example, if the autonomous vehicle 102 travels through the low signal reception area 140 and cannot receive the GPS signals 160, upon exiting the low signal reception area 140, the autonomous vehicle 102 can verify the accuracy of the GPS computations before updating the clock 240. It should be appreciated that accurately updating the internal clock of the autonomous vehicle 102 based on the GPS time 106 enables other systems, such as radar systems, to synchronize transmissions for long-range object detection and tracking.

Figure 5:
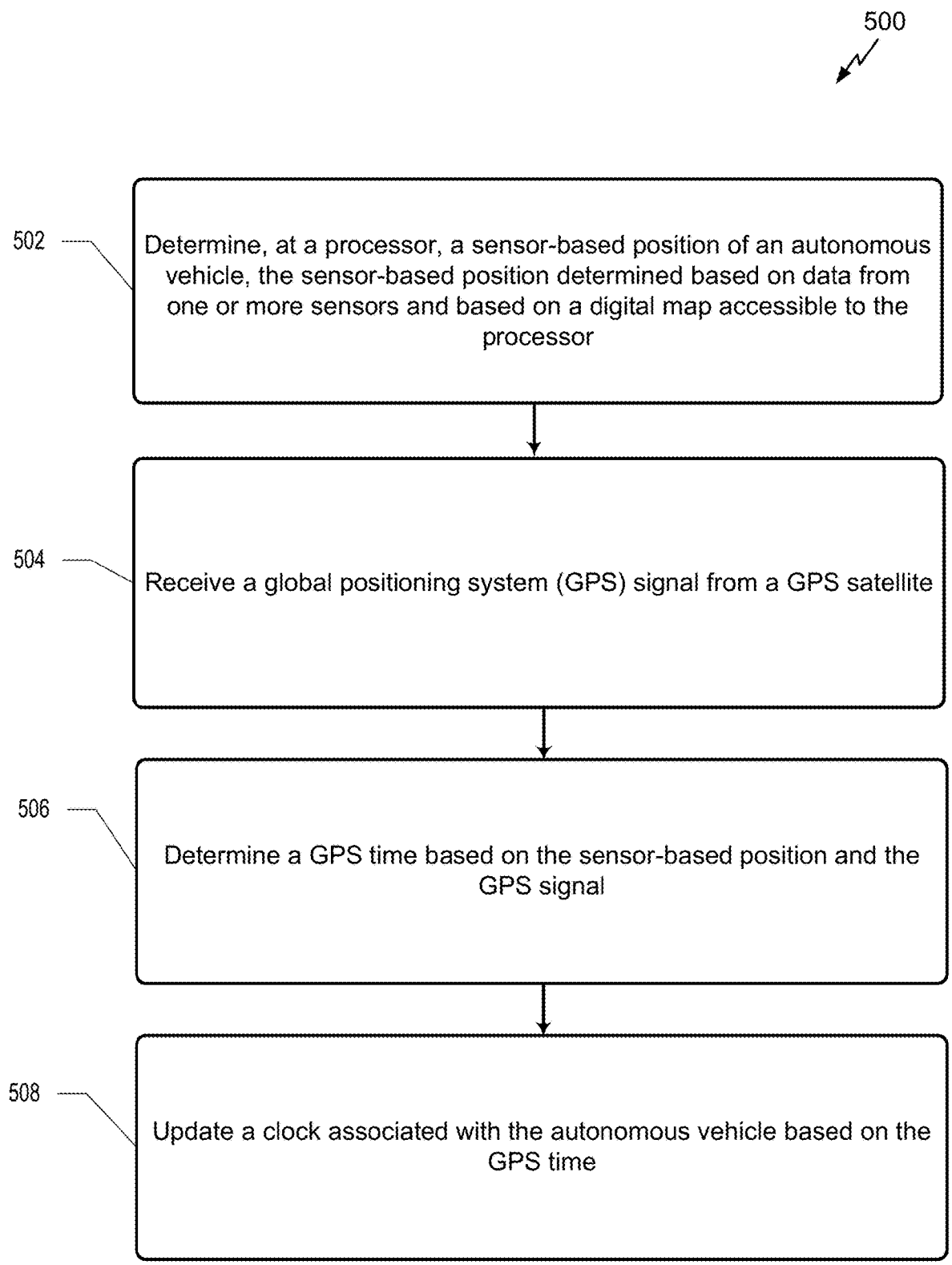
FIG. 5 is a flowchart of another method, according to an example embodiment.

FIG. 5 is a flowchart of a method 500, according to an example embodiment. The method 500 can be performed by the autonomous vehicle 102.

The method 500 includes determining, at a processor, a sensor-based position of an autonomous vehicle, at 502. The sensor-based position is determined based on data from one or more sensors and based on a digital map that is accessible to the processor. For example, the sensor-based position determination module 260 may determine the sensor-based position 108 of the autonomous vehicle 102 independently from GPS data, as described above.

The method 500 also includes receiving a GPS signal from a GPS satellite, at 504. For example, the GPS receiver 220 can receive the GPS signal 160B from the GPS satellite 150B, as illustrated in FIGS. 2-3. The method 500 further includes determining a GPS time based on the sensor-based position and the GPS signal, at 506. The method 500 also includes updating a clock associated with the autonomous vehicle based on the GPS time, at 508.

The method 500 of FIG. 5 enables use of the sensor-based position 108 to determine the GPS time 106 and update the clock 240 in scenarios where limited GPS reception is available, such as when the autonomous vehicle 102 is surrounded by tall buildings.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
a global positioning system (GPS) receiver configured to receive a plurality of GPS signals from GPS satellites;
one or more sensors;
a clock; and
a processor coupled to the GPS receiver, the one or more sensors, and the clock, the processor configured to:
determine a sensor-based position of an autonomous vehicle, the sensor-based position determined based on data generated from the one or more sensors and based on a digital map accessible to the processor;
determine a GPS computed position of the autonomous vehicle and a GPS time, the GPS computed position and the GPS time determined based on the plurality of GPS signals;
compare the sensor-based position to the GPS computed position to determine whether the sensor-based position is within a threshold distance from the GPS computed position; and
update the clock based on the GPS time in response to a determination that the sensor-based position is within the threshold distance from the GPS computed position.

2. The system of claim 1, wherein, based on the comparison, the processor is further configured to detect GPS spoofing.

3. The system of claim 1, wherein, in response to a determination that the sensor-based position is not within the threshold distance from the GPS computed position, the processor is further configured to:
determine whether a period of time has elapsed since comparing the sensor-based position to the GPS computed position; and
in response to a determination that the period of time has elapsed:
determine a second sensor-based position of the autonomous vehicle at a second time instance;
determine a second GPS computed position of the autonomous vehicle and a second GPS time;
compare the second sensor-based position to the second GPS computed position to determine whether the second sensor-based position is within the threshold distance from the second GPS computed position; and
update the clock associated with the autonomous vehicle based on the second GPS time in response to a determination that the second sensor-based position is within the threshold distance from the second GPS computed position.

4. The system of claim 1, wherein, in response to a determination that the sensor-based position is not within the threshold distance from the GPS computed position, the processor is further configured to:
monitor at least one condition; and
upon detection of a change in the at least one condition:
determine a second sensor-based position of the autonomous vehicle at a second time instance;
determine a second GPS computed position of the autonomous vehicle and a second GPS time;
compare the second sensor-based position to the second GPS computed position to determine whether the second sensor-based position is within the threshold distance from the second GPS computed position; and
update the clock associated with the autonomous vehicle based on the second GPS time in response to a determination that the second sensor-based position is within the threshold distance from the second GPS computed position.

5. The system of claim 4, wherein the at least one condition corresponds to a number of GPS satellites having GPS signals within range of the autonomous vehicle, and wherein detecting the change in the at least one condition comprises detecting a different number of GPS satellites having GPS signals within range of the autonomous vehicle.

6. The system of claim 1, wherein the one or more sensors comprises at least one of an inertial measurement unit, a radar unit, a wheel speed sensor, or a Lidar unit.

7. The system of claim 1, wherein the one or more sensors is configured to detect properties associated with the autonomous vehicle, and wherein the properties comprise at least one of an orientation of the autonomous vehicle, a speed of the autonomous vehicle, an acceleration associated with the autonomous vehicle, or an altitude of the autonomous vehicle.

8. The system of claim 1, wherein, in response to a determination that the GPS receiver is only receiving a particular GPS signal from a single GPS satellite, the processor is configured to:
  determine the GPS time based on the sensor-based position and the particular GPS signal; and
  update the clock based on the GPS time.

9. A method of updating a clock associated with an autonomous vehicle, the method comprising:
  determining, at a processor, a sensor-based position of the autonomous vehicle, the sensor-based position determined based on data from one or more sensors and based on a digital map accessible to the processor;
  determining, at the processor, a global positioning system (GPS) computed position of the autonomous vehicle and a GPS time, the GPS computed position and the GPS time determined based on a plurality of GPS signals received from GPS satellites;
  comparing the sensor-based position to the GPS computed position to determine whether the sensor-based position is within a threshold distance from the GPS computed position; and
  updating the clock associated with the autonomous vehicle based on the GPS time in response to a determination that the sensor-based position is within the threshold distance from the GPS computed position.

10. The method of claim 9, further comprising detecting GPS spoofing based on the comparison.

11. The method of claim 9, in response to a determination that the sensor-based position is not within the threshold distance from the GPS computed position, further comprising:
  determining whether a period of time has elapsed since comparing the sensor-based position to the GPS computed position; and
  in response to a determination that the period of time has elapsed:
    determining a second sensor-based position of the autonomous vehicle at a second time instance;
    determining a second GPS computed position of the autonomous vehicle and a second GPS time;
    comparing the second sensor-based position to the second GPS computed position to determine whether the second sensor-based position is within the threshold distance from the second GPS computed position; and
    updating the clock associated with the autonomous vehicle based on the second GPS time in response to a determination that the second sensor-based position is within the threshold distance from the second GPS computed position.

12. The method of claim 9, in response to a determination that the sensor-based position is not within the threshold distance from the GPS computed position, further comprising:
  monitoring at least one condition; and
  upon detecting a change in the at least one condition:
    determining a second sensor-based position of the autonomous vehicle at a second time instance;
    determining a second GPS computed position of the autonomous vehicle and a second GPS time;
    comparing the second sensor-based position to the second GPS computed position to determine whether the second sensor-based position is within the threshold distance from the second GPS computed position; and
    updating the clock associated with the autonomous vehicle based on the second GPS time in response to a determination that the second sensor-based position is within the threshold distance from the second GPS computed position.

13. The method of claim 12, wherein the at least one condition corresponds to a number of GPS satellites having GPS signals within range of the autonomous vehicle, and wherein detecting the change in the at least one condition comprises detecting a different number of GPS satellites having GPS signals within range of the autonomous vehicle.

14. The method of claim 9, wherein the one or more sensors comprises at least one of an inertial measurement unit, a radar unit, a wheel speed sensor, or a Lidar unit.

15. The method of claim 9, wherein the one or more sensors is configured to detect properties associated with the autonomous vehicle, and wherein the properties comprise at least one of an orientation of the autonomous vehicle, a speed of the autonomous vehicle, an acceleration associated with the autonomous vehicle, or an altitude of the autonomous vehicle.

16. A non-transitory computer-readable medium having stored therein instructions executable by a processor to cause the processor to perform functions, the functions comprising:
  determining a sensor-based position of an autonomous vehicle, the sensor-based position determined based on data from one or more sensors and based on a digital map accessible to the processor;
  determining a global positioning system (GPS) computed position of the autonomous vehicle and a GPS time, the GPS computed position and the GPS time determined based on a plurality of GPS signals received from GPS satellites;
  comparing the sensor-based position to the GPS computed position to determine whether the sensor-based position is within a threshold distance from the GPS computed position; and
  updating a clock associated with the autonomous vehicle based on the GPS time in response to a determination that the sensor-based position is within the threshold distance from the GPS computed position.

17. The non-transitory computer-readable medium of claim 16, wherein the functions further comprise detecting GPS spoofing based on the comparison.

18. The non-transitory computer-readable medium of claim 16, wherein the one or more sensors comprises at least one of an inertial measurement unit, a radar unit, a wheel speed sensor, or a Lidar unit.

19. The non-transitory computer-readable medium of claim 16, wherein the one or more sensors is configured to detect properties associated with the autonomous vehicle, and wherein the properties comprise at least one of an orientation of the autonomous vehicle, a speed of the autonomous vehicle, an acceleration associated with the autonomous vehicle, or an altitude of the autonomous vehicle.

20. The non-transitory computer-readable medium of claim 16, wherein, in response to a determination that the GPS receiver is only receiving a particular GPS signal from a single GPS satellite, the functions further comprise:
   determining the GPS time based on the sensor-based position and the particular GPS signal; and
   updating the clock based on the GPS time.

* * * * *